United States Patent
Kim

(10) Patent No.: US 11,137,816 B2
(45) Date of Patent: Oct. 5, 2021

(54) SOFTWARE OPERATION METHOD FOR MANAGING POWER SUPPLY AND APPARATUS USING THE SAME

(71) Applicant: Dialog Semiconductor Korea Inc., Seongnam-si (KR)

(72) Inventor: Beom Jin Kim, Seongnam-si (KR)

(73) Assignee: Dialog Semiconductor Korea Inc., Seoul (KR)

(*) Notice: Subject to any disclaimer, the term of this patent is extended or adjusted under 35 U.S.C. 154(b) by 0 days.

(21) Appl. No.: 16/516,311

(22) Filed: Jul. 19, 2019

(65) Prior Publication Data
US 2020/0026341 A1    Jan. 23, 2020

(30) Foreign Application Priority Data
Jul. 19, 2018  (KR) .................. 10-2018-0083781

(51) Int. Cl.
*G06F 1/3228*    (2019.01)
*G06F 9/4401*    (2018.01)
(Continued)

(52) U.S. Cl.
CPC .......... *G06F 1/3228* (2013.01); *G06F 1/3296* (2013.01); *G06F 9/4418* (2013.01);
(Continued)

(58) Field of Classification Search
CPC .... G06F 1/3228; G06F 1/3278; G06F 1/3287; G06F 1/3296; G06F 9/4418; Y02D 10/00
See application file for complete search history.

(56) References Cited

U.S. PATENT DOCUMENTS

| | | | | |
|---|---|---|---|---|
| 5,825,674 | A | * | 10/1998 | Jackson .............. G06F 9/30185 713/321 |
| 2006/0015855 | A1 | * | 1/2006 | Kumamoto ........... G06F 9/3851 717/136 |

(Continued)

FOREIGN PATENT DOCUMENTS

| KR | 10-2014-0053857 | 9/2012 |
|----|-----------------|--------|
| KR | 10-2016-0121876 | 10/2016 |
| WO | 2012/120085 | 9/2012 |

OTHER PUBLICATIONS

Korean Office Action, Application No. 10-2018-0083781, Applicant: FCI Inc., dated Jul. 3, 2019.

*Primary Examiner* — Terrell S Johnson
(74) *Attorney, Agent, or Firm* — Saile Ackerman LLC; Stephen B. Ackerman

(57) ABSTRACT

A software operation method for managing power supply and an electronic apparatus using the same are provided. The electronic apparatus includes a controller configured to convert a state into a sleep state, to convert the sleep state into a wake-up state for every first interval and to execute the first software. The controller is configured to convert the wake-up state into the sleep state, if an execution of the first software ends. The controller is configured to convert the sleep state into the wake-up state for every second interval and to execute the second software. The controller is configured to convert the wake-up state into the sleep state, if an execution of the second software ends. A classification into the first software and the second software is made based on an execution period.

12 Claims, 6 Drawing Sheets

(51) Int. Cl.
 *G06F 1/3296* (2019.01)
 *G06F 1/3287* (2019.01)
 *G06F 1/3234* (2019.01)

(52) U.S. Cl.
 CPC .......... *G06F 1/3278* (2013.01); *G06F 1/3287* (2013.01); *Y02D 10/00* (2018.01)

(56) References Cited

U.S. PATENT DOCUMENTS

| | | | | |
|---|---|---|---|---|
| 2008/0288802 A1* | 11/2008 | Fleck | .................... | G06F 1/3203 713/324 |
| 2010/0023788 A1* | 1/2010 | Scott | ..................... | G06F 1/3209 713/320 |
| 2014/0056197 A1* | 2/2014 | Deng | ................ | H04W 52/0225 370/311 |

* cited by examiner

SOFTWARE OPERATION METHOD FOR MANAGING POWER SUPPLY AND APPARATUS USING THE SAME

BACKGROUND OF INVENTION

Field of Invention

The disclosure relates to a software operation method for managing power supply and an apparatus using the same.

Description of Prior Art

The following information is presented as background information only to assist with an understanding of the disclosure. There is no determination or assertion to whether any of the following information might be applicable as prior art regarding the disclosure.

When using a related-art electronic apparatus, the user turns on the power only when using the electronic apparatus, and turns off the power when done with it. However, in a case that the user is always unaware of turning on the power of the electronic apparatus when the electronic apparatus receives a data from another apparatus via communication. The electronic apparatus controlled to be turned on always will quickly consume the battery thereof, and thus a capacity and duration of the battery becomes a problem.

Furthermore, more electronic apparatuses have enabled to use a wireless communication and be carried due to the advancement of technology. Accordingly, a battery consumption problem of electronic apparatuses has become more of an issue. To resolve such a problem, division of power modes of an electronic apparatus has been made. For example, as an electronic apparatus, a using of mobile phone is divided into a case that the user directly has a phone conversation or playing games using a mobile phone and a case that the user does not directly use the mobile phone such as when user is watching movie in a theater. In the former case, electrical power is applied to all internal elements of the mobile phone, but in the latter case, the electrical power is only applied to communication-related elements among the internal elements of the mobile phone.

SUMMARY OF INVENTION

In view of the above, the present invention provides a software operation method for managing power supply and an apparatus using the same. In addition, according to the disclosure, it is possible to reduce power consumption in a power saving mode, and to quickly convert a state into a wake-up state.

In order to achieve above-mentioned object of the present invention, one embodiment of the present invention provides an electronic apparatus for managing a power supply. The electronic apparatus includes a first memory, a second memory, a transceiver, a timer, and a controller. The first memory is configured to store information necessary for maintaining connection with a network. The second memory is configured to store a first software and a second software. The transceiver is configured to transmit or receive a data. The timer is configured to check an execution period of the first software and the second software. The controller is configured to convert a state into a sleep state, to convert the sleep state into a wake-up state for every first interval and to execute the first software, to convert the wake-up state into the sleep state, if an execution of the first software ends, to convert the sleep state into the wake-up state for every second interval and to execute the second software, and to convert the wake-up state into the sleep state, if an execution of the second software ends. A classification into the first software and the second software is made based on an execution period.

Furthermore, another embodiment of the present invention provides a method for managing a power supply by an electronic apparatus. The method includes the steps of converting a state into a sleep state, converting the sleep state into a wake-up state for every first interval and executing the first software, converting the wake-up state into the sleep state, if an execution of the first software ends, converting the sleep state into the wake-up state for every second interval and executing the second software, and converting the wake-up state into the sleep state, if an execution of the second software ends. A classification into the first software and the second software is made based on an execution period.

As described above, according to the example embodiment, it is possible to reduce an average power consumption in a power saving mode of an electronic apparatus. In addition, according to the example embodiment, it is possible to reduce a time consumption to convert a sleep state into a wake-up state.

DETAILED DESCRIPTION OF EMBODIMENTS

The following description of the embodiments is provided by reference to the following drawings and illustrates the specific embodiments of the present invention. Directional terms mentioned in the present invention, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof. In the following description, well-known functions or constructions are not described in detail since they would obscure the application with unnecessary detail.

In addition, in describing the elements of the disclosure, the terms such as first, second, A, B, (a), (b) and the like may be used. The terms are used to distinguish one element from another, and the essence or the order of the corresponding element is not limited to the terms. Further, when a certain portion is stated as "comprising" or "providing" a certain element, unless otherwise stated, this means that the certain portion may include another element, rather than foreclosing the same. According to example embodiments, a "unit" or "module" refers to a unit that performs at least one function or operation, and may be implemented as hardware or software, or a combination of hardware and software.

Figure 1:
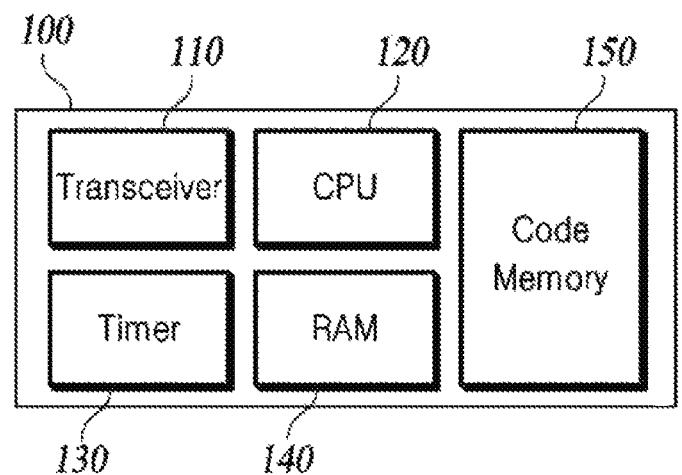
FIG. 1 is a schematic diagram illustrating a configuration of an electronic apparatus according to an embodiment of the present invention.

FIG. 1 is a diagram illustrating a configuration of an electronic apparatus according to an embodiment of the present invention.

Referring to FIG. 1, the electronic apparatus 100 may include a transceiver 110, a central processing unit (CPU) 120, a timer 130, a RAM 140, and a code memory 150.

In FIG. 1, the apparatus is divided into numerous elements. However, multiple elements may be implemented as being integrated into a single element or one element may be implemented as being divided into multiple elements.

The transceiver 110 may perform transmission and receiving of data with another apparatus. For example, when the electronic apparatus 100 supports a wireless communication, the transceiver 110 may perform transmission and receiving of data with a Wi-Fi access point (AP). In addition, when the electronic apparatus 100 supports a mobile communication, the transceiver 110 may perform transmission and receiving of data with a base station (Evolved Node B, eNB).

The CPU 120 (or controller) may control the other elements of the electronic apparatus 100. For example, the CPU 120 may control the transceiver 110 to perform transmission and receiving of data, and read data from the RAM 140 or the code memory 150.

The timer 130 may be used to synchronize internal elements of the electronic apparatus 100. When a power of the electronic apparatus 100 is in a power saving mode, the timer 130 may be used to trigger conversion between a sleep state and a wake-up state.

The RAM 140 may be used to store data required during operation of the electronic apparatus 100, may be used to store a software download from the code memory 150 and may be used to provide the downloaded software to CPU120 for executing.

The code memory 150 is a memory which is maintained in a state of keeping a software code even if a power of the electronic apparatus 100 is turned off. The code memory 150 may be a flash memory. In general, a booting program may be stored in the code memory 150.

Although not illustrated in FIG. 1, the electronic apparatus 100 may be included a battery for power supply, and various sensors, etc.

The power mode of the electronic apparatus may be roughly divided into a connection mode and a power saving mode. The electronic apparatus may be always connected to network regardless of modes. However, depending on a frequency and amount of data that the electronic apparatus transmitting to and receiving from the network, the power mode of the electronic apparatus may be divided into the connection mode and the power saving mode. For example, if the user uses an Internet game performing in the electronic apparatus, it is necessary to constantly transmitting and receiving data and thus, the power mode of the electronic apparatus enters the connection mode. If the user does not use the electronic apparatus, the power mode of the electronic apparatus may be the power saving mode. In addition, the connection mode and the power saving mode may be classified according to what element of the internal elements of the electronic apparatus receiving a power supply.

Hereinafter, the power saving mode of the electronic apparatus will be described. In detail, a Wi-Fi system will be described as an example, but the example is not limited thereto.

Figure 2:
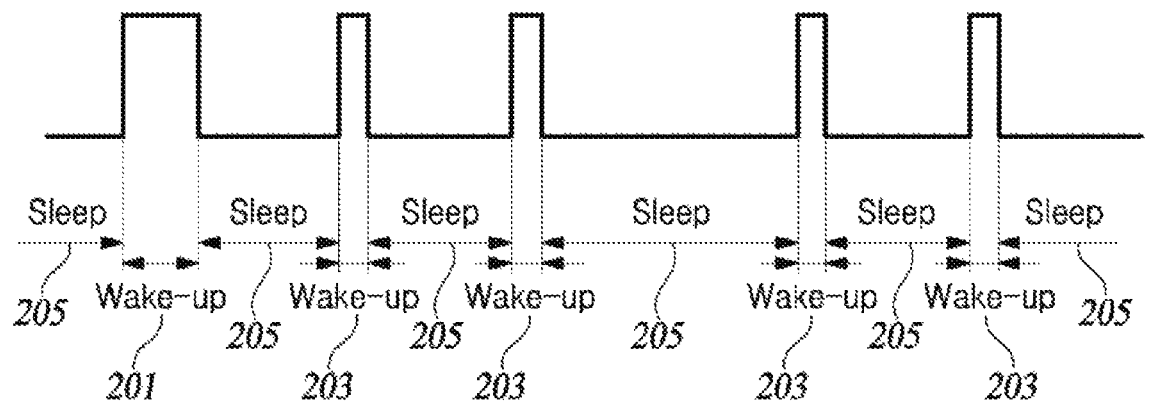
FIG. 2 is a schematic diagram illustrating a change of power state relating to a time in a power saving mode of an electronic apparatus according to an embodiment of the present invention.

FIG. 2 is a diagram illustrating a change of power state relating to a time in a power saving mode of an electronic apparatus according to an embodiment of the present invention.

Even if the power mode of the electronic apparatus is a power saving mode, the electronic apparatus may be connected to the network and an authentication is completed. The electronic apparatus may be in a standby state for communication anytime. Accordingly, the electronic apparatus may periodically turn on the power, receive a beacon signal, and identify whether there is data to be transmitted or received, and if there is no data to be transmitted or received, block the power supply for the remaining elements excepting minimum elements for receiving the next signal of the beacon. As such, a state in which a power of the electronic apparatus is turned on to receive a beacon signal is referred to as a wake-up state 201 and 203, and a state in which a power of the remaining elements is block excepting minimum elements is referred to as a sleep state 205.

For example, in the sleep state 205, the electronic apparatus may block a power of the transceiver of the internal elements. Alternatively, the electronic apparatus may selectively block the power of the remaining elements other than the timer and some of the RAM. However, the electronic apparatus may pre-store information relating to a network connected before converting into the sleep state 205. In addition, the electronic apparatus may set to convert at the next wake-up state 201 and 203 by using the timer. The electronic apparatus may block the power of the transceiver in the sleep mode 205 and thus, no data may be transmitted or received.

The electronic apparatus may periodically or non-periodically convert the sleep mode 205 into the wake-up state 201 and 203. The sleep state 205 may be converted into the wake-up state 201 and 203 for every transmission period of a beacon signal (beacon interval), and may be converted into the wake-up state 201 and 203 for every delivery traffic indication map (DTIM) period. In general, the DTIM period may be integer multiples of a beacon interval. In addition, if a data to be transmitted by the electronic apparatus is present or it is necessary to periodically monitor a sensor, even if the beacon signal is not received, it is possible to convert the sleep state 205 into the wake-up state 201 and 203.

For the electronic apparatus to convert the sleep state 205 into the wake-up state 201 and 203, it is necessary to perform booting for loading and initializing a software. Accordingly, when converting the sleep state 205 into the wake-up state 201 and 203, the electronic apparatus may take the booting time prior to reception of a beacon signal into account. When the electronic apparatus is converted into the wake-up state 201 and 203, the electronic apparatus receives the beacon signal and identify whether a data to be further received is present, whether it is necessary to change network settings, whether reconnection is necessary, etc. If an additional operation of the electronic apparatus is not necessary, the wake-up state 203 may be maintained for only a short period of time and converted into the sleep state 205 again. However, if the additional operation of the electronic apparatus is necessary, the wake-up state 201 may be maintained for a long period of time. For example, the electronic apparatus transmits a data, it is necessary to receive an acknowledgment from the other party and update the result into the electronic apparatus and thus, the wake-up state 201 may be maintained for a long period of time. That is, the electronic apparatus may differ a time of maintaining according to an amount of jobs to be handled in the wake-up state 201.

In the power saving mode of the electronic apparatus, the wake-up state 201 and 203 and the sleep state 205 are repeatedly converted into each other.

Figure 3A:
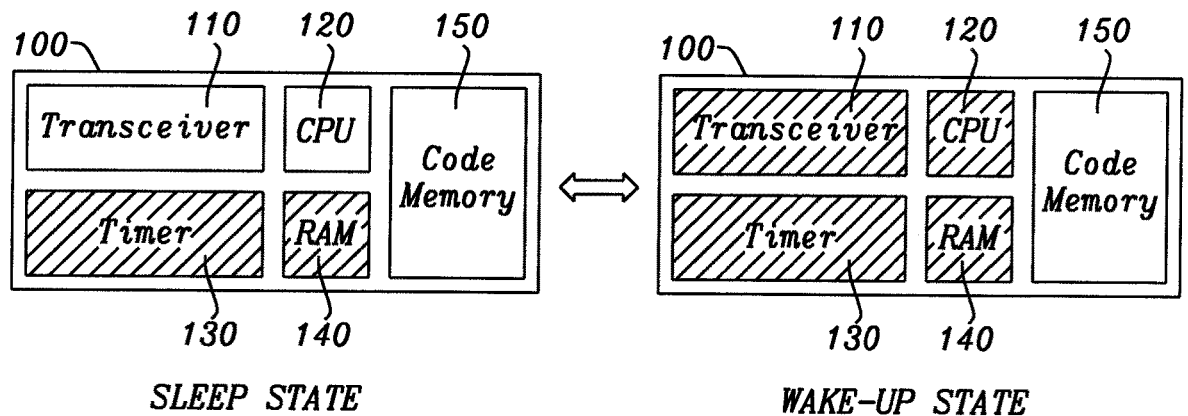
FIG. 3A and FIG. 3B are schematic diagrams illustrating an operating method of a software managing a power mode of an electronic apparatus according to an embodiment of the present invention.
Figure 3B:
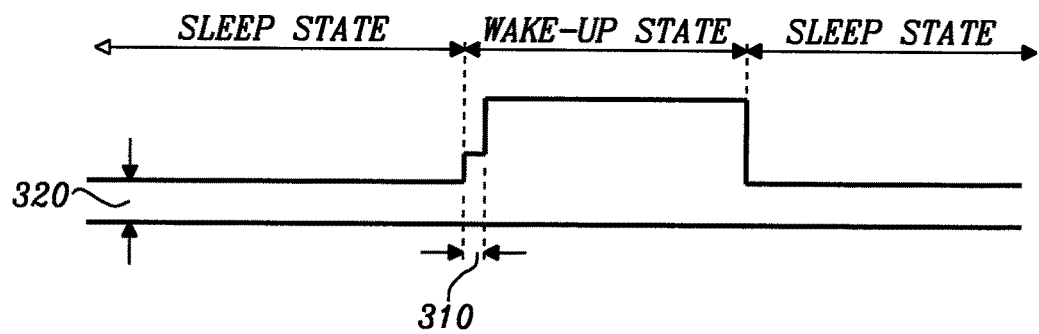

FIG. 3A and FIG. 3B are diagrams illustrating an operating method of a software managing a power mode of an electronic apparatus according to an embodiment of the present invention.

Referring to FIG. 3A, the electronic apparatus 100 may, in the sleep state, turn on powers of the timer 130 and the RAM 140 only, and in the wake-up state, turn on powers of the transceiver 110 and the CPU 120 as well as the timer 130 and the RAM 140.

The software operation method described with reference to FIG. 3A and FIG. 3B includes performing full booting when the power of the electronic apparatus 100 is initially turned on with a software. Even if the electronic apparatus 100 is converted into the sleep state thereafter, it maintains the power of the RAM 140 used by the CPU 120 and preserves a data stored in the RAM 140. Accordingly, even if the electronic apparatus 100 is converted from the sleep state into the wake-up state, it is only necessary to execute a simple initialization process without software loading. This operation method has an advantage that the booting time 310 is very short, but has a drawback that the power consumption 320 is large because the power of RAM 140 is maintained on.

Figure 4A:
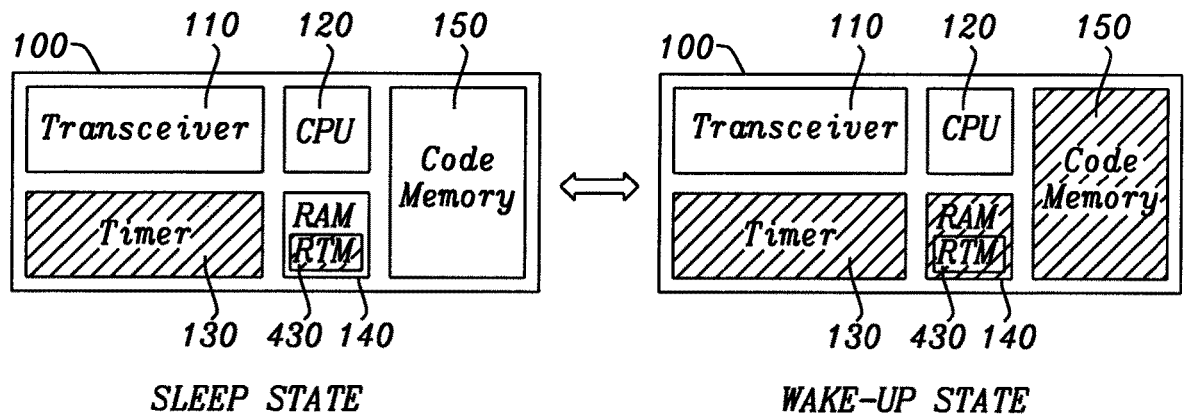
FIG. 4A and FIG. 4B are schematic diagrams illustrating an operating method of a software managing a power mode of an electronic apparatus according to another embodiment of the present invention.
Figure 4B:
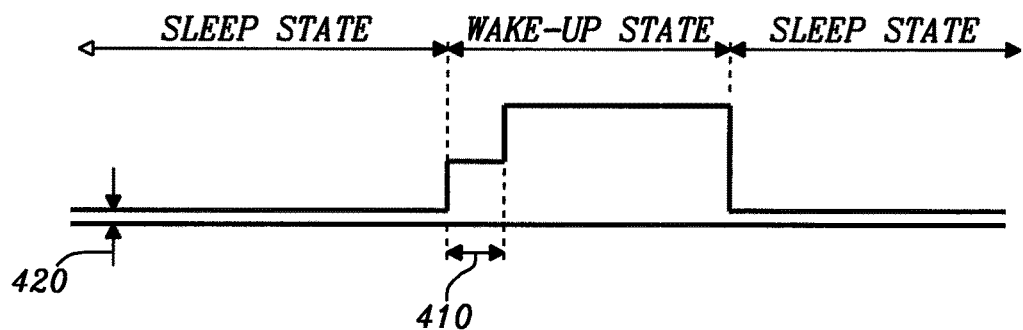

FIGS. 4A and 4B are diagrams illustrating an operating method of a software managing a power mode of an electronic apparatus according to another embodiment of the present invention.

Referring to FIG. 4A, the electronic apparatus 100 may, in the sleep state, turn on only powers of the timer 130 and a retention memory (RTM) 430 which is part of the RAM 140, and in the wake-up state, turn on powers of all internal elements of the electronic apparatus 100 include the code memory 150.

The software operation method described with reference to FIG. 4A and FIG. 4B includes performing full booting when a power of the electronic apparatus 100 is initially turned on with a software. When the electronic apparatus is thereafter converted into the sleep state, storing a data required for maintaining connection, such as Wi-Fi connection information, transmission control protocol (TCP) session connection information and the like in the RTM 430, and maintaining only the power of the RTM 430 to be on. That is, other elements of the electronic apparatus 100 excepting the timer 130 and the RTM 430 may be turned off, and thereby the power consumption 420 is minimized. This operation method has a drawback that the booting time 410 is long because it is necessary to load and initialize the software again when the electronic apparatus 100 is converted into the wake-up mode. If it is necessary to frequently convert the electronic apparatus 100 into the wake-up state because the beacon signal reception interval is short, an average power consumption may be rather increased due to the booting time.

Figure 5:
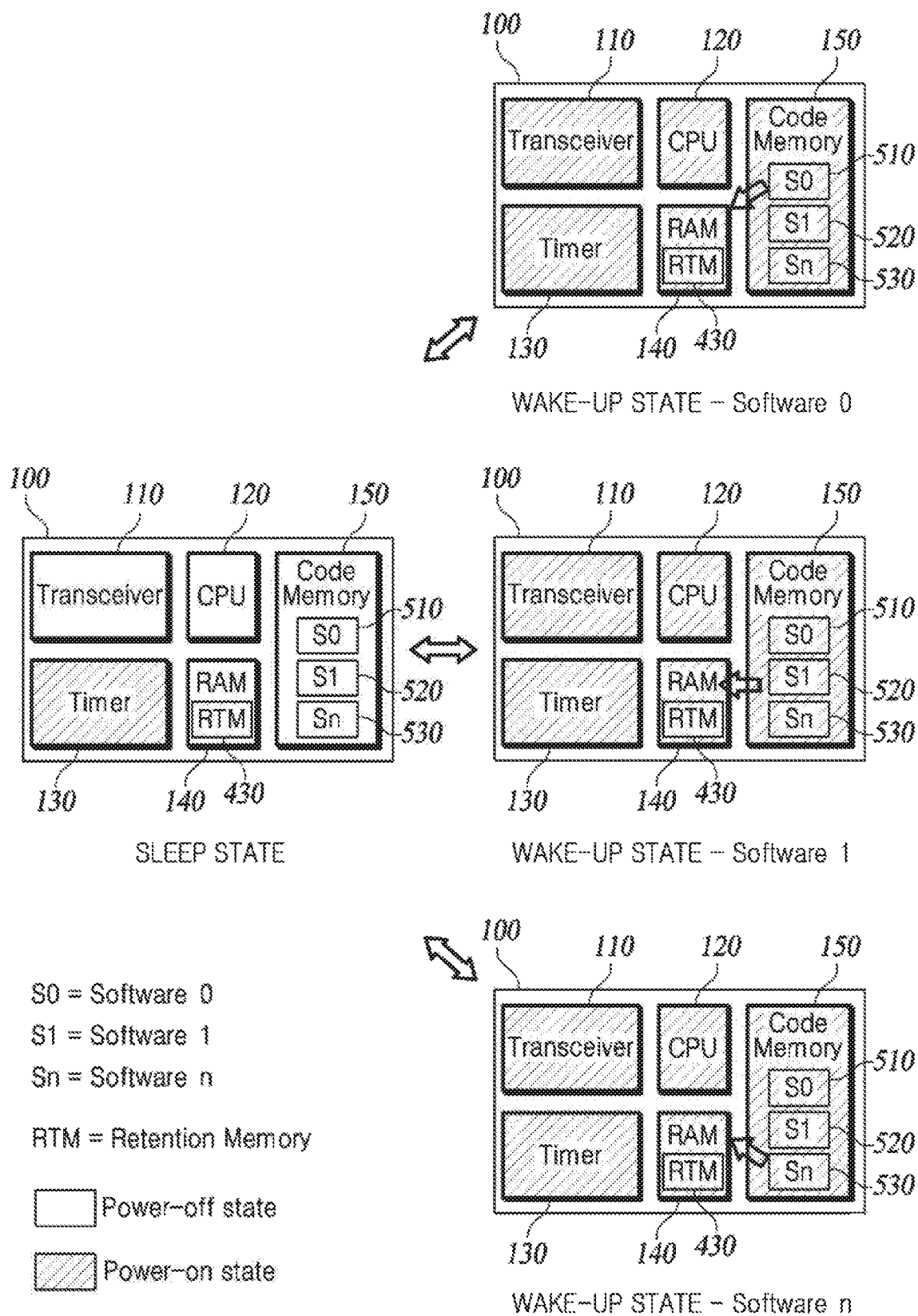
FIG. 5 is a diagram illustrating an operating method of a software managing a power mode of an electronic apparatus according to yet another embodiment of the present invention.

FIG. 5 is a diagram illustrating an operating method of a software managing a power mode of an electronic apparatus according to yet another embodiment of the present invention.

Referring to FIG. 5, as described with reference to FIG. 4, a data required for maintaining various connections is stored in the RTM 430 which is part of the RAM 140, and a power is supplied even when the electronic apparatus 100 is in the sleep state. The data stored in the RTM 430 may be used to synchronize software which will be described later.

The software operation method described with reference to FIG. 5 is a method in which, while several software are executed, different software are executed according to an amount of jobs to be performed by the electronic apparatus in the power saving mode. For example, it is necessary to receive a beacon signal frequently and periodically. This operation is easy and simple. It is possible to operate a software 0 (S0) therefor. In addition, if it is necessary to periodically check a sensor, a software 1 (S1) performing the execution may be executed separately from a software 0 (S0) receiving a beacon signal and processing the received beacon signal. However, although not frequent, if it is necessary to handle a number of jobs such as transmitting and receiving a data with another apparatus, updating network information, and the like, the jobs may be operated by an additional software n (Sn) 530 which is different from the software 0 (S0) 510 and the software 1 (S1) 520.

That is, the software 0 (S0) 510 periodically performs only a simple function. The software loading time and software initialization time which are booting times can be reduced and the power consumption due to booting can be reduced. The software 1 (S1) 520 may have a different period from the software 0 (S0) 510, and may be operated to perform a different function. If the software 0 (S0) 510 and the software 1 (S1) 520 perform similar functions at the same intervals, they may be operated as a single software. In addition, if it is necessary to further perform a different function after the software 0 (S0) 510 is executed, another software may be booted. Finally, the software n (Sn) 530 may be operated to perform many various functions that are occasionally performed. Accordingly, the software n (Sn) 530 has a longer software loading time and software initialization time which are a booting time than the software 0 (S0) 510 and the software 1 (S1) 520. Thus, a power consumption may be large during booting. However, if the software n (Sn) 530 has a long execution period or an execution frequency is limited low enough, it is possible to maintain low average power consumption.

Thus, if dividing by frequency of executed functions and categorization into the software 0 (S0) 510, the software 1 (S1) 520, the software n (Sn) 530, etc. is made and managed, it is possible to minimize the average power consumption.

Data synchronization between the respective software may be done through the RTM 430. The RTM 430 may store not only information required for maintaining various connections but also information to which all executed software refer in common or information to be transferred from one software to another. The respective software may, when being converted into wake-up, initialize variables thereof including state information, etc. from the RTM 430, and thereafter update a result of executing its own corresponding function to the RTM 430.

Figure 6A:
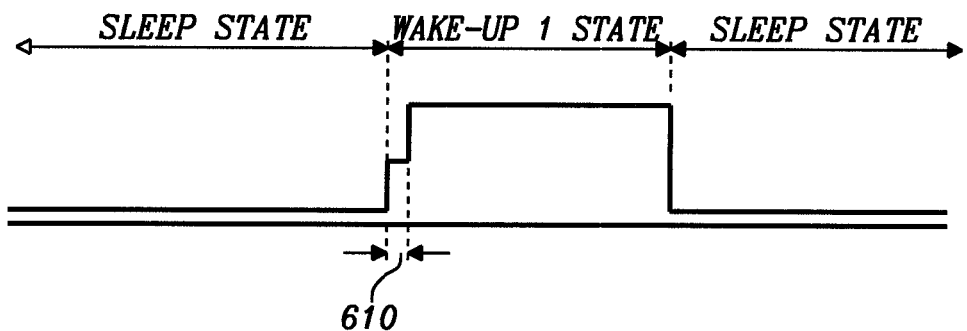
FIG. 6A and FIG. 6B are schematic diagrams illustrating a booting time of a software according to FIG. 5.
Figure 6B:
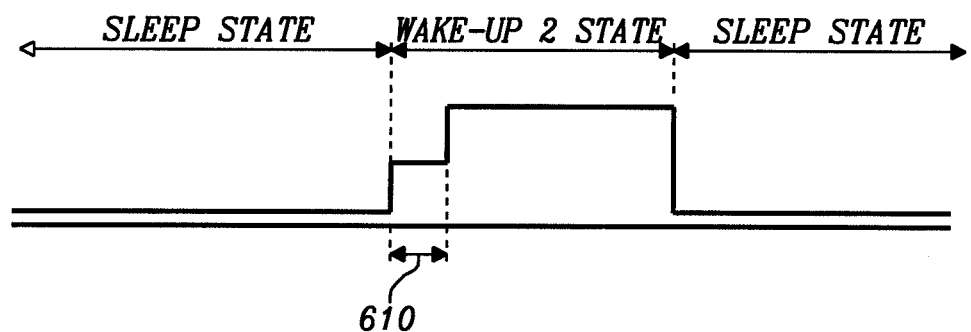

FIG. 6A and FIG. 6B are diagrams illustrating a booting time of a software according to FIG. 5.

FIG. 6A illustrates a booting time 610 of the software 0 (S0) 510 described with reference to FIG. 5. FIG. 6B illustrates a booting time 620 of the software n (Sn) 530 described with reference to FIG. 5. The software 0 (S0) 510 has a short execution period and performs only simple functions and thus, the booting time 610 is relatively short. In contrast, the software n (Sn) 530 has a long execution period but performs many various functions and thus, the booting time 610 may be longer.

Figure 7:
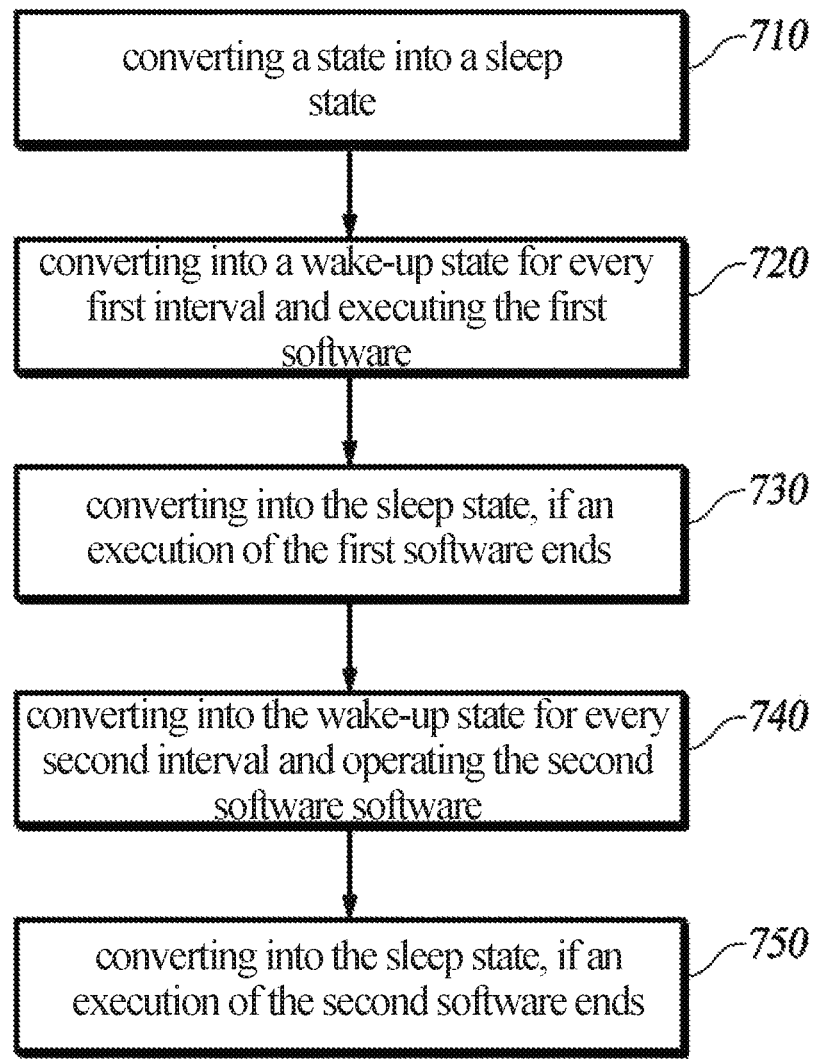
FIG. 7 is a schematic flow chart diagram of a software for managing an electronic apparatus according to an embodiment of the present invention.

FIG. 7 is a flow chart diagram of a software for managing an electronic apparatus according to an example embodiment of the present invention.

At Step 710, the electronic apparatus may be converted into a sleep state as a power mode is changed to a power saving mode. The electronic apparatus may, in the sleep state, block powers of some elements of the internal elements. For example, when a power supply to a transceiver is blocked, the electronic apparatus may not transmit or receive data. The electronic apparatus may store, in a memory, information required for maintaining connection with a network before converting into the sleep state. As described above, by storing the information required for maintaining the network connection, the electronic apparatus may quickly connect with the network when converting into the wake-up state.

At Step 720, the electronic apparatus may convert from the sleep state into the wake-up state for every first interval and execute a first software. For example, the electronic apparatus may convert the sleep state into the wake-up state for every first interval to receive a beacon signal.

At Step 730, the electronic apparatus may convert the wake-up state into the sleep state again when an execution of the first software ends.

At operation 740, the electronic apparatus may convert from the sleep state into the wake-up state for every second interval and execute a second software. For example, the electronic apparatus may convert the sleep state into the wake-up state for every second interval to transmit and receive data.

At Step 750, the electronic apparatus may convert the wake-up state into the sleep state when an execution of the second software ends.

The first software and the second software may use a memory which is always turned on, for synchronization of data. That is, the respective software may initialize variables, etc. using information stored in the memory during booting, and when the operation is complete, update information required for the memory.

Classification into the first software and the second software may be done according to at least any one of an execution period and a function which is performed. Alternatively, additional classification into the first software and the second software may be done to minimize power consumption during booting. In addition, the first software and the second software may have different booting times.

In FIG. 7, the Steps 710, 720, 730, 740 and 750 are sequentially carried out, but this is an only one example of the technical idea of the embodiment of the present invention. In other words, a person skilled in the art to which an embodiment pertains would be capable of changing an order illustrated in FIG. 7 for execution or performing various modifications so that one or more processes from among the Steps 710, 720, 730, 740 and 750 are executed in parallel without departing from the spirit and the scope of the disclosure, and thus FIG. 7 is not limited to the time series order.

Meanwhile, the process illustrated in FIG. 7 may be implemented as a computer-readable code on a computer-readable recording medium. The computer-readable recording medium includes all types of recording apparatuses for storing data readable by a computer system. The non-transitory computer-readable medium may include storage medium such as a magnetic storage medium (e.g., ROM, floppy disc, a hard disc, and the like), an optical readable medium (e.g., a compact disc (CD), a digital versatile disc (DVD), and the like), and a carrier wave (e.g., transmission via the Internet). The recording medium readable by a computer may be distributed in computer systems that are connected over a network so that a code readable by a computer may be stored and executed in a dispersion method.

Although example embodiments of the present disclosure have been illustrated and described, it should be understood that the present disclosure is not limited to the disclosed embodiments and may be variously changed without departing from the spirit and the scope of the present disclosure. While the disclosure has been shown and described with reference to various embodiments thereof, it will be understood by those skilled in the art that various changes in form and details may be made therein without departing from the spirit and scope of the disclosure as defined by the appended claims and their equivalents. While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus for managing power supply, comprising:
   a first memory configured to store a first software and a second software;
   a second memory configured to be a memory region where the first software and the second software are executed;
   a timer configured to check an execution period of the first software and the second software;
   a transceiver configured to receive a data necessary to determine a period during which the electronic apparatus is kept in a wake-up state;
   and
   a controller configured to:
      switch the electronic apparatus from a sleep state to the wake-up state by loading either the first software or the second software into the second memory according to an execution cycle; and
      switch the electronic apparatus from the wake-up state to the sleep state after the period;
   wherein the first software has a high execution frequency and a small size, and the second software has a low execution frequency and a large size.

2. The electronic apparatus as claimed in claim 1, wherein the first software and the second software have different functions.

3. The electronic apparatus as claimed in claim 1, wherein the electronic apparatus comprises a third memory configured to store information necessary for maintaining connection with a network and information necessary for data synchronization of the first software and the second software.

4. The electronic apparatus as claimed in claim 1, wherein the first software and the second software have different booting times.

5. The electronic apparatus as claimed in claim 1, wherein the first software and the second software have different power consumption during booting.

6. The electronic apparatus as claimed in claim 1, wherein the first software is a software for receiving a beacon signal of a Wi-Fi system.

7. A method for managing a power supply by an electronic apparatus, the method comprising the steps of:
   switching the electronics apparatus from a wake-up state into a sleep state;
   switching the electronics apparatus from the sleep state into the wake-up state for every first interval and executing the first software;
   switching the electronics apparatus from the wake-up state into the sleep state, if an execution of the first software ends;
   switching the electronics apparatus from the sleep state into the wake-up state for every second interval and operating the second software; and
   switching the electronics apparatus from the wake-up state into the sleep state, if an execution of the second software ends,
   wherein the first software has a high execution frequency and a small size, and the second software has a low execution frequency and a large size.

8. The method as claimed in claim 7, wherein the first software and the second software have different functions.

9. The method as claimed in claim 7, wherein the first software and the second software have different booting times.

10. The method as claimed in claim 7, wherein the first software and the second software synchronize a data by a memory.

11. The method as claimed in claim 7, the first software and the second software have different power consumption during booting.

12. The method as claimed in claim 7, wherein the first software is a software for receiving a beacon signal of a Wi-Fi system.

* * * * *